J. B. MARSHEL.
COTTON HARVESTER.
APPLICATION FILED MAY 23, 1911.
1,042,703.
Patented Oct. 29, 1912.
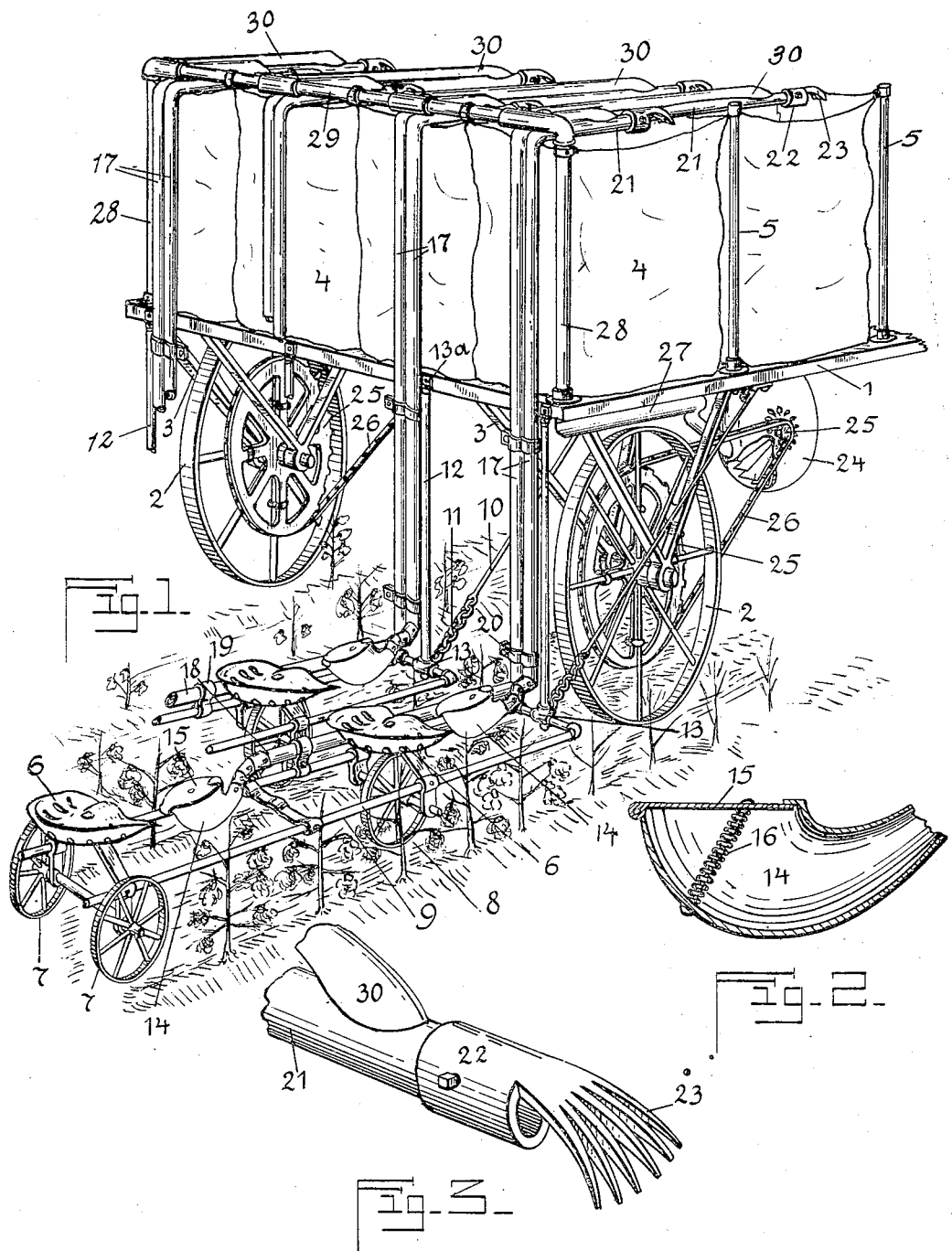

UNITED STATES PATENT OFFICE.

JOHN B. MARSHEL, OF DALLAS, TEXAS.

COTTON-HARVESTER.

1,042,703.          Specification of Letters Patent.          Patented Oct. 29, 1912.

Application filed May 23, 1911. Serial No. 628,972.

*To all whom it may concern:*

Be it known that I, JOHN B. MARSHEL, a citizen of the United States, residing at Dallas, in the county of Dallas and State of Texas, have invented certain new and useful Improvements in Cotton-Harvesters, of which the following is a specification.

My invention relates to new and useful improvements in cotton harvesters.

In the present methods of gathering cotton, the pickers walk from plant to plant along a row each dragging a large sack in which is deposited each handful of cotton as it is gathered. The persons engaged in this work are obliged to constantly bend over in order to reach the plants, and they must frequently work upon their knees in gathering cotton close to the ground. The continual stooping and bending thus occasioned exerts a severe strain upon the backs of the workers, and if the ground is damp the work is made still more disagreeable and difficult. In working under such conditions the efficiency of the laborers is considerably lessened by the energy wasted in walking along the rows and in bending over, and in thrusting the handfuls of cotton into the sacks.

It is the object of the present invention to permit the pickers to devote their entire energy to gathering the cotton by seating them upon small trucks drawn behind a wagon, upon which the cotton sacks are carried, receptacles being provided adjacent to the trucks in which the cotton may be quickly deposited, and a mechanical means being provided for transferring the cotton from said receptacles to the sacks upon the wagon.

A further object of the invention is to provide a system of pneumatic tubes for elevating the cotton from said receptacles to the cotton sacks, fans being operated by the traction wheels of the wagon to produce the necessary suction in the tubes.

Finally the object of the invention is to provide a device of the character described that will be simple and efficient and comparatively easy to construct, and one that will enable a field of cotton to be picked over in a much shorter time than can be accomplished by present methods.

With these and various other objects in view, my invention has relation to certain novel features of the construction and operation, an example of which is described in the following specification and illustrated in the accompanying drawing, wherein:

Figure 1 is a perspective view showing the rear end of the wagon which carries the cotton sacks, one of the small trucks being shown which are trailed behind the wagon, and a portion of another, the pneumatic system for elevating the cotton being also clearly shown. Fig. 2 is a detail sectional view of one of the receptacles in which the pickers deposit the cotton, with which receptacle the pneumatic tubes communicate. Fig. 3 is a detail perspective view showing the discharge outlet of one of the pneumatic tubes with a device mounted thereupon to deflect the escaping cotton downward into the sacks.

Referring now more particularly to the drawing, wherein like numerals of reference designate similar parts in all the figures, the numeral 1 denotes the platform of a wagon provided with transporting wheels 2, each of which is mounted between a pair of brackets 3, projecting downward from the under surface of the wagon platform. Upon the platform of the wagon are carried a plurality of cotton sacks 4, which are held upright and open by any suitable means, such as vertical posts 5, to the upper extremities of which the edges of the sacks may be secured. At the rear of the wagon are attached several small three wheeled trucks, of which there will preferably be four, each truck being adapted to travel between two rows of cotton plants, and being provided with two seats which are denoted by the numeral 6.

The numeral 7 is applied to the rear wheels of each truck, and the numeral 8 to the front wheel thereof. These wheels support a frame designated by the numeral 9, consisting of a pair of parallel bars connected by a cross-bar at their front extremities.

Each truck is attached to the wagon by an elongated rod 10, and a short link of chain 11, the upper extremity of said rod being pivotally secured beneath the platform 1, and the chain serving to attach the lower extremity of the rod to the front end of the truck frame. The front end of each frame 9 is also attached to the platform 1 by a vertical bar 12, having its lower end slidably mounted in a collar 13 at the front of the truck frame and having its upper end hinged to the rear end of the platform 1, as indicated at 13ª.

In front of each seat 6 and within easy reach of the person occupying the same is positioned a receptacle 14 of sufficient size to receive a small quantity of cotton. Each receptacle is provided with a hinged top 15, adapted to swing down to give access to the receptacle, the hinge being at the rear end of the top which is normally held closed by a coiled spring 16 within the receptacle. Each of the receptacles 14 communicates with a vertical pipe 17, the forward receptacles being positioned closely adjacent to the lower end of the pipe 17, while the rear receptacles are connected with the pipe 17 through horizontal pipes 18 attached to the frames of the trucks by brackets 19. Each pair of adjacent pipes 17 are clamped together as indicated at 20. These pipes 17 ascend closely adjacent to the rear end of the platform 1 to a height equal to that of the cotton sacks carried by said platform, and they then communicate with horizontal pipes 21 extending forwardly, each of which discharges into one of the cotton sacks. A means, which will presently be described, is provided to produce a suction in the pipes 17 and 21 that will cause the cotton to be drawn from the receptacles 14 immediately upon being introduced therein, and to pass up through the pipes 17 and 21 to the discharge outlets of the latter. These outlets are provided with deflectors consisting of collars 22 fixed upon the extremities of the pipes 21, having a portion 23 overhanging the outlet and provided with downwardly curved fingers against which the escaping cotton strikes and is deflected downward into the cotton sacks 4.

A means will now be described by which a partial vacuum is created adjacent to the outlet of the pipes 21, so as to cause the cotton to be drawn up into said pipes.

Beneath the platform 1 of the wagon are mounted two blower fans 24, each of which is adapted to be actuated from one of the transporting wheels by a pair of sprocket wheels 25 receiving a sprocket chain 26. The sprocket wheel carried by the transporting wheels is in each case much larger than the one carried by the fan, so that the rotation communicated to the fan may be of a relatively high velocity. Each fan discharges into a pipe 27, extending rearwardly beneath the platform 1, and communicating with a vertical pipe 28 at its rear end. The pipes 28 extend to a height slightly above the upper extremities of the pipes 17, and there communicate with a transverse pipe 29, extending above the pipes 17 at their juncture with the pipes 21. A plurality of pipes 30 branch forwardly from the pipe 29, and communicate with the pipes 21 near the forward ends of the latter.

In the use of the above described machine, each of the small trucks will carry two persons, the trucks being sufficiently low to permit said persons to easily reach the growing cotton from their seats. As the trucks are trailed slowly along between the rows, these persons will gather the cotton and thrust each handful as it is picked into the receptacles 14. The strength of the springs 16 will be such as to allow the covers 15 to readily yield under pressure of the hand, but said springs will be strong enough to prevent the covers being pressed in due to the difference of air pressure within and without the receptacles.

A team will preferably be employed to draw the wagon slowly across the cotton field, although the wagon might be also motor driven, this being a well known expedient. A source of power for the operation of the fans might also be carried by the wagon if desired instead of driving said fans from the traction wheels in the manner above specified.

The above described invention enables the cotton pickers to work under the most favorable conditions possible, exerting no strain upon any of their muscles except those which are brought into use in gathering the cotton from the plants and transferring it to the receptacles conveniently placed.

It is possible that some other mechanical means than that shown and described might be employed to elevate the cotton from the small trucks to the sacks carried by the wagon, and various other changes might be made in the details of the invention and proportions of parts without departing from the spirit of the invention. The device is, therefore, presented as covering all such changes and modifications as may be included within the scope of the following claim.

What I claim is:

In a cotton harvester, the combination with a vehicle provided with cotton receiving receptacles, and wheeled trailing trucks provided with suitable seats for pickers, of a relatively small receptacle carried just in front of each of said seats, a hinged closure for each of said small receptacles opening inwardly and being normally held seated by a spring, a pipe communicating with each small receptacle and having a discharge outlet above one of said cotton receiving receptacles, a downwardly inclined deflector overhanging the discharge outlet of each pipe, a blower fan mounted beneath the vehicle and adapted to be driven from one of the transporting wheels, the discharge pipe of said fan connecting to the first named pipes near their discharge outlet, and directing the blast of air from said fan toward said discharge outlet at a high velocity.

In testimony whereof I have signed my name to this specification in the presence of two subscribing witnesses.

JOHN B. MARSHEL.

Witnesses:
J. S. MURRAY,
L. MORRIS.